United States Patent
Imbornone et al.

(10) Patent No.: US 7,502,278 B1
(45) Date of Patent: Mar. 10, 2009

(54) ANALOG BEAMFORMERS FOR CONTINUOUS WAVE ULTRASONIC RECEIVERS

(75) Inventors: James Francis Imbornone, Methuen, MA (US); Ron Gatzke, Lexington, MA (US); John Scampini, Lexington, MA (US); Jean-Marc Roger Mourant, Groton, MA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 200 days.

(21) Appl. No.: 11/439,679

(22) Filed: May 23, 2006

(51) Int. Cl.
*G01S 3/802* (2006.01)

(52) U.S. Cl. .................................... 367/103

(58) Field of Classification Search .............. 367/7, 367/103, 135; 73/626; 600/457
See application file for complete search history.

(56) References Cited

U.S. PATENT DOCUMENTS

| | | | |
|---|---|---|---|
| 4,140,022 A | 2/1979 | Maslak | |
| 4,825,109 A * | 4/1989 | Reynolds | 327/271 |
| 5,095,536 A * | 3/1992 | Loper | 455/324 |
| 5,555,534 A | 9/1996 | Maslak et al. | |
| 5,817,024 A * | 10/1998 | Ogle et al. | 600/447 |
| 5,828,247 A * | 10/1998 | Moller et al. | 327/110 |
| 5,835,850 A * | 11/1998 | Kumar | 455/67.14 |
| 5,966,666 A * | 10/1999 | Yamaguchi et al. | 455/552.1 |
| 6,648,826 B2 | 11/2003 | Little et al. | |
| 2006/0079784 A1* | 4/2006 | Shifrin | 600/457 |

* cited by examiner

*Primary Examiner*—Dan Pihulic
(74) *Attorney, Agent, or Firm*—Blakely Sokoloff Taylor & Zafman LLP

(57) ABSTRACT

Analog beamformers for continuous wave ultrasonic receivers, typically realized in integrated circuit form and using a direct quadrature baseband conversion architecture for CW Doppler to eliminate a second down conversion mixer and second synthesizer. The beamformers use integrated mixers and LO's for phase steering, and dedicated ring counters for each channel for lower noise. Input filtering may be provided with switchable RF input low pass filters. The integrated circuit includes the ultrasound signal VGA and beamformer on the same chip. An auxiliary channel may be included for a self-test mode. Also a programmable bit soft shutdown feature, programmable via the serial port, allows disabling individual channels. Various other features are disclosed including cascading of multiple integrated circuits for a much greater number of channels.

14 Claims, 13 Drawing Sheets

ANALOG BEAMFORMERS FOR CONTINUOUS WAVE ULTRASONIC RECEIVERS

BACKGROUND OF THE INVENTION

1. Field of the Invention

The present invention relates to the field of continuous wave ultrasonic receivers.

2. Prior Art

In terms of prior art, there are only a few methods used today to implement the analog continuous wave (CW) beamformer for ultrasonic receivers. These include the following:

U.S. Pat. No. 5,555,534 discloses a technique known as the Phase Rotator. In this technique, the outputs of a quadrature downconverter (two mixers driven in quadrature) are combined by a Phase Rotator as shown in FIG. 1.

The Phase Rotator works on the principle of a weighted summing of the I and Q output signals from the mixers in such a way as to rotate their phases while maintaining quadrature (see FIGS. 2 and 3). The 534 patent gives a table of the required I and Q weighting factors from summation (Table 1).

TABLE 1

Weighting Factors for Phase Rotator

| Phi Word | I+ Output | Q+ Output | I− Output | Q− Output |
|---|---|---|---|---|
| 000 | +I7 − Q3 | +Q7 + I3 | −I7 + Q3 | −Q7 − I3 |
| 001 | +I7 + Q3 | +Q7 − I3 | −I7 − Q3 | −Q7 + I3 |
| 010 | +Q7 + I3 | −I7 + Q3 | −Q7 − I3 | +I7 − Q3 |
| 011 | +Q7 − I3 | −I7 − Q3 | −Q7 + I3 | +I7 + Q3 |
| 100 | −I7 + Q3 | −Q7 − I3 | +I7 − Q3 | +Q7 + I3 |
| 101 | −I7 − Q3 | −Q7 + I3 | +I7 + Q3 | +Q7 − I3 |
| 110 | −Q7 − I3 | +I7 − Q3 | +Q7 + I3 | −I7 + Q3 |
| 111 | −Q7 + I3 | +I7 + Q3 | +Q7 − I3 | −I7 − Q3 |

As used in Table 1:

+I7 represents the input lead originating from the sqrt(2)/2 weighted output of I.

+I3 represents the input lead origination from the (1−sqrt(2)/2) weighted output of I.

−I7 represents the input lead origination from the −sqrt(2)/2 weighted output of I.

−I3 represents the input lead origination from the −(1−sqrt(2)/2) weighted output of I. +Q7 represents the input lead originating from the sqrt(2)/2 weighted output of Q.

+Q3 represents the input lead originating from the (1−sqrt(2)/2) weighted output of Q.

−Q7 represents the input lead origination from the −sqrt(2)/2 weighted output of Q.

−Q3 represents the input lead originating from the −(1−sqrt(2)/2) weighted output of Q.

To further understand the Phase Rotator method we can look at an example. To generate the I/Q vector pair (a/b) in FIG. 3, (a) is equal to +0.383Q and +0.924I and (b) is equal to +0.383I and −0.924Q. Therefore in order to make this a/b vector pair, one needs to have two different positive amplitudes of I and one positive and one negative amplitude of Q.

Access to each of the +/−Q (or +/−I) vectors are needed at the same time, which requires four weighting functions (represented diagrammatically in FIG. 2 as variable gain amplifiers).

Using a Phase Rotator, it is difficult to do the switching required at the IF due to 1/f noise concerns for low Doppler offset frequencies.

Another approach is disclosed in U.S. Pat. No. 4,140,022 and illustrated in FIG. 6. In some present equipment, the variations in compensating delays are achieved by changing taps on delay lines as shown in FIG. 4. The taps cannot be more than a small fraction of the period of a carrier wave apart if the cycles of the carrier wave are to arrive at the summing point nearly in phase. This requires the number of taps in this approach to be large. At the carrier frequencies employed, only a relatively expensive electrical delay line can be used because of bandwidth considerations, and the provision of a large number of taps on this type of line is a significant portion of the cost of the entire instrument.

Of equal significance is the fact that, unless expensive tap changing switches are used, the switching transients cause a significant amount of noise in the signals arriving at the summing point and therefore in the image produced from them.

The problem of cost and transient noise just referred to increase in severity when the carrier frequency is increased to obtain better definition, the aperture of the array is increased to obtain better focusing, or the minimum range is decreased so as to permit the examination of infants.

FIG. 5 shows a prior art approach in which phase shifting means are used in combination with coarsely tapped delay lines to achieve the phase coherence required for focusing. In this case, phase shifters are inserted between the transducers and their respective delay lines.

In the preferred embodiment of U.S. Pat. No. 4,140,022, delay line taps are not relied on for producing phase coherence. The phase changing is effected by respectively heterodyning the carrier waves from each transducer with different phases of an oscillator output that are selected so as to focus the array at one point. The intermediate frequency waves are then applied to coarsely spaced taps on a delay line system that have delays nearest to that required for precisely focusing the transducer. By selection of the frequency of the local oscillator, one of the intermediate frequency sidebands of the mixer outputs can be low enough in frequency to permit the use of surface acoustic delay lines that cost much less than an electrical delay line. The use of more widely spaced taps in this invention simplifies design problems because there are fewer taps to cause troublesome reflections. In essence, the heterodyning is used for a fine phase adjust while the coarse taps on the master delay line are used for coarse phase adjust. With this method it is possible to use delay means having fewer inputs or taps than would be required to produce the required phase coherence if the delay means alone were used.

U.S. Pat. No. 6,648,826 describes a CW beamformer in an ASIC. In this patent the beamformer may be used for either CW ultrasound receive or transmit beamforming. However the patent does not discuss the details of the actual circuit operation.

DETAILED DESCRIPTION OF THE PREFERRED EMBODIMENTS

Analog Beamforming for CW Ultrasound is accomplished by adjusting the phase of the local oscillators being applied to mixers in the ultrasound front-end receiver. In an Analog Beamformer system, the received signals from an array of transducers from a particular focal point are lined up coherently by adjusting the phase of each receiver, and are summed. This provides spatial processing gain because the noise of the channels is uncorrelated.

In a preferred embodiment of the present invention (see FIGS. 7 and 8), the phase adjust to each channel is programmed via a serial shift register. In the specific embodiment shown, an 8 channel device is illustrated, the serial shift register comprising the series connected 8, 5-bit SRs in FIG. 7, also labeled SSR in FIG. 8. In this embodiment, a 4-bit word, together with a 5'th bit for programmable channel shutdown, is provided to each channel to set the phase. If all 4 bits are used, then the phase to each channel can be adjusted in 22.5 degree increments (360/16). Lower phase resolution of 45 degree and 90 degree increments can be achieved by using only 3 or 2 bits, respectively. The shift register is made up of serial shift register sections with only DATA and DATA_CLOCK inputs (as opposed to a more conventional serial port with a 3-wire interface made up of DATA, DATA_CLOCK and LOAD, where the LOAD line triggers a parallel shift in of the data to the shift register once all the data has been clocked in serially). This is done to speed up the programming of the beamformer. This unique feature of this embodiment also requires that the end user ensure that the DATA_CLOCK input is as noise free as possible to ensure that only desired DATA is clocked in. The LOAD signal shown in FIGS. 7 and 8 goes to the Divider 16/8/4 block of FIG. 8 and is used to synchronize the channels via connection to the load inputs of the S/R-D Flip Flops that comprise the ring counter. A 4-bit word in a shift register segment provides a 16-bit decoded signal. However the contents of each shift register segment sets the initial decoded values provided to each of the 8 dividers that, as shall be seen, divide the clock by 16, 8 or 4 with the proper phasing for each of the 8 channels.

Figure 9A:
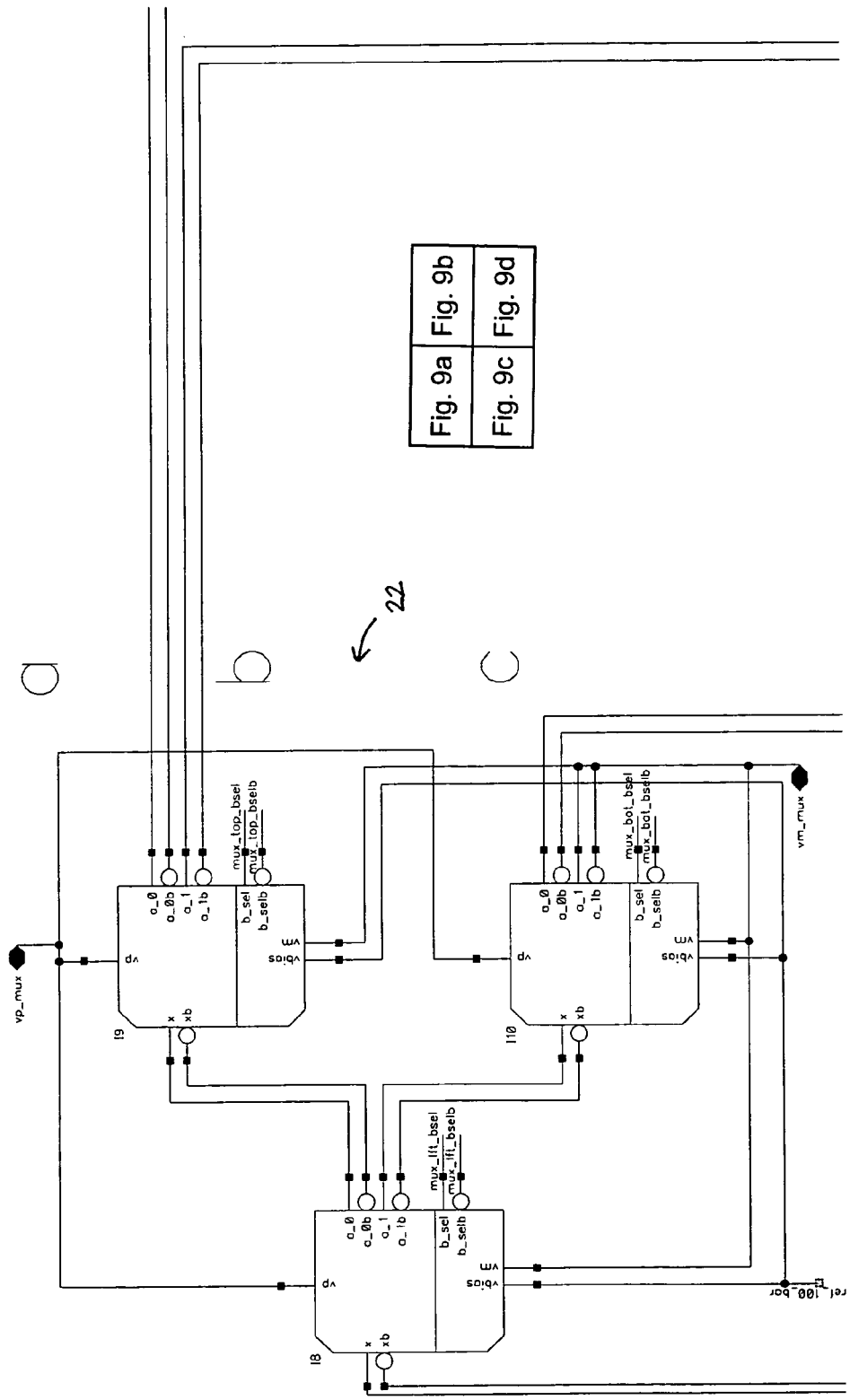
FIG. 9, consisting of FIGS. 9a through 9d, is a block diagram of a divider used in the embodiment of FIG. 7.
Figure 9B:
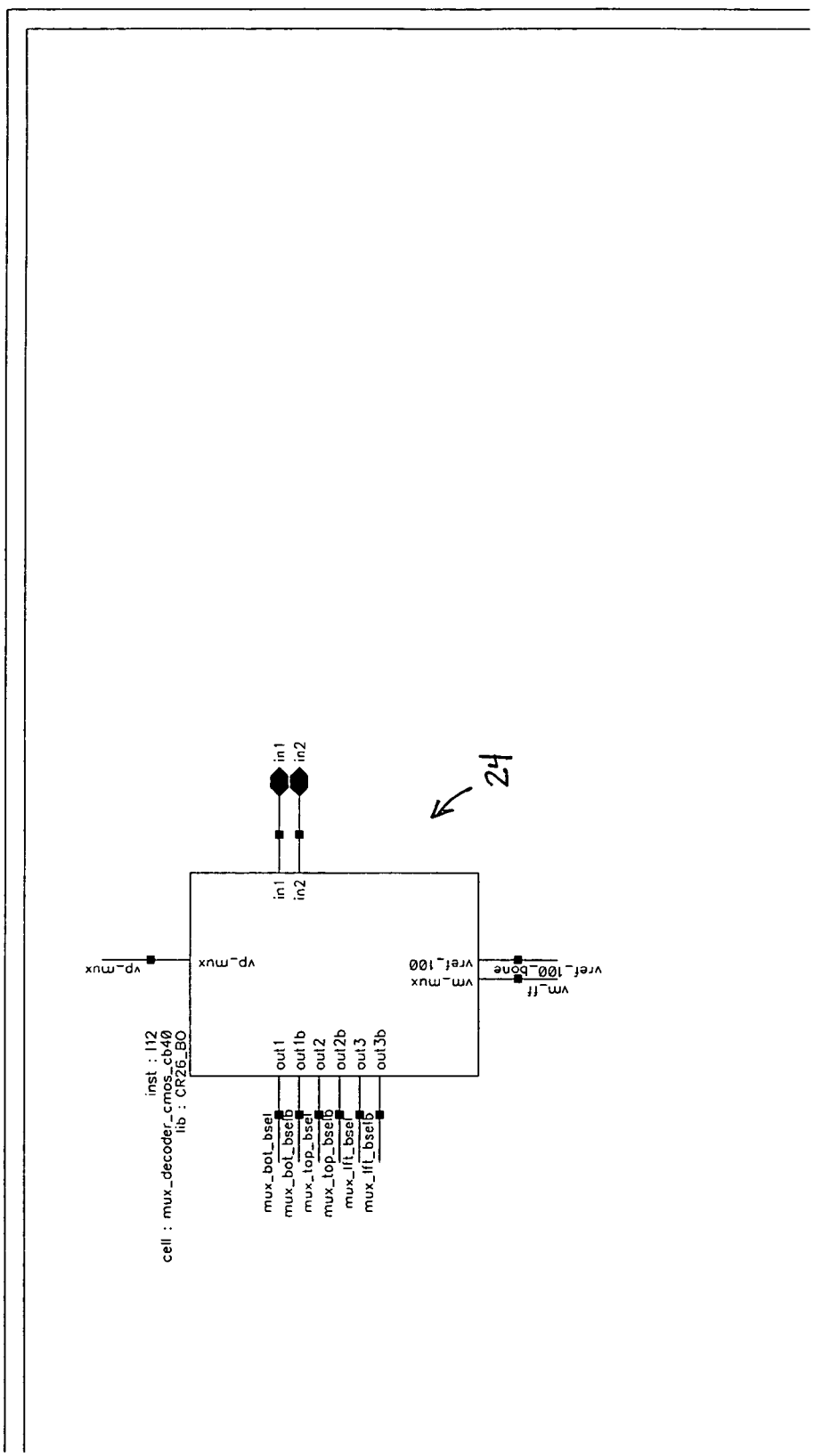
Figure 9C:
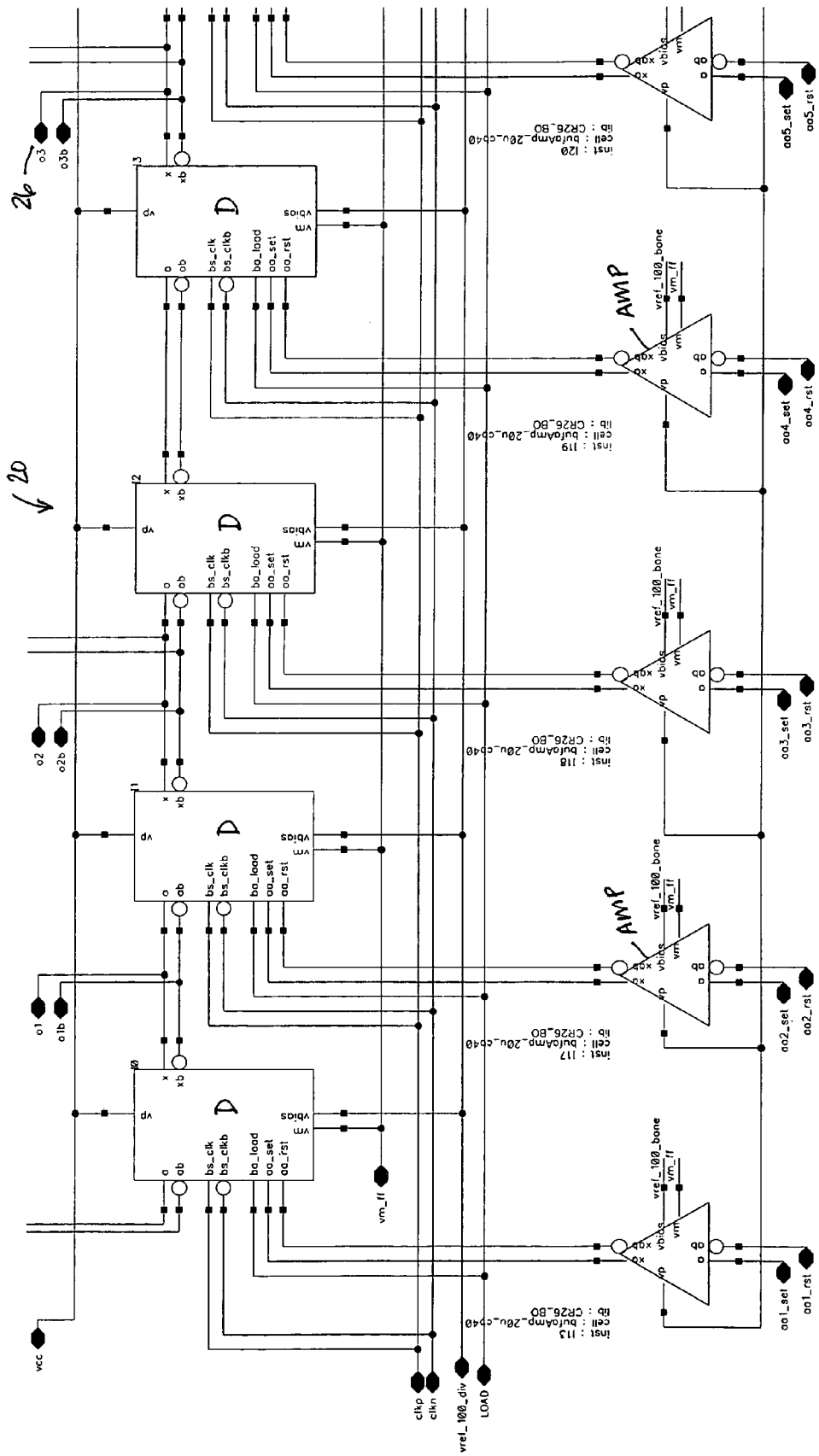
Figure 9D:
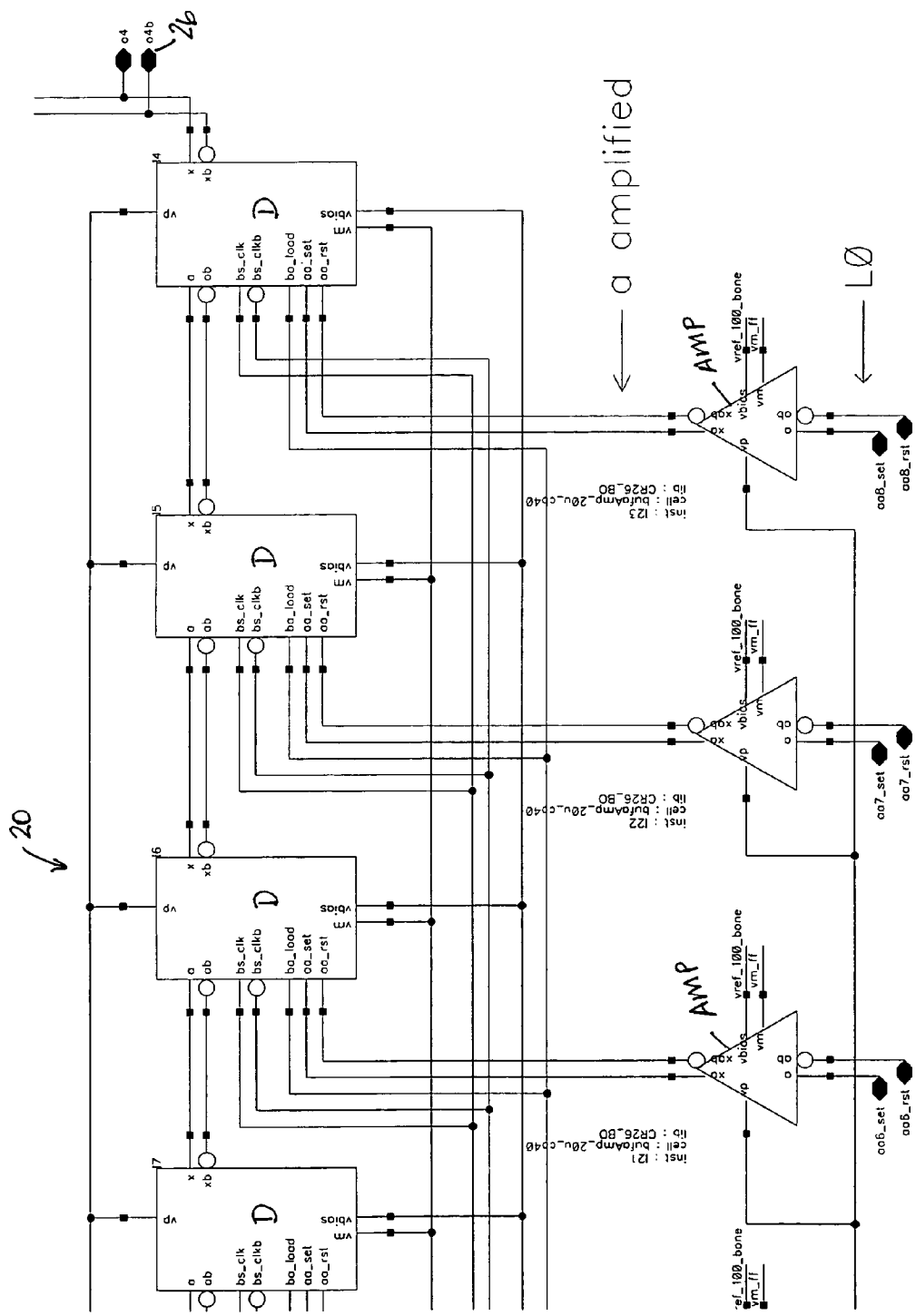

In particular, as shown in FIG. 9, each divider is configured as a Johnson ring counter 20 to provide the desired phase calibration and quadrature (see FIGS. 9c and 9d). Taking the case of 22.5 degrees of phase resolution, 8 master/slave D flip-flops are cascaded, with the eighth or final stage's Q output being inverted and sent back to the first counter's input. The counter is run synchronously. Clocking a bit pattern through 8 times while inverting and feeding back the output bits to the beginning of the Johnson counter, and then clocking the inverted pattern through 8 more times, produces 16 phases. Note that these are the possible phases that could be obtained based on the shift register contents. In the divide by 16 and 8 modes, only one inphase $I_n$, its inverse $I_nB$, its quadrature components $Q_n$ and its inverse $Q_nB$ are used at any one time. The counters are normally clocked at 16, 8 and 4 times the ultrasonic excitation frequency, for the divide by 16, 8 and 4 modes, to provide a baseband beamformer output.

Figure 1:
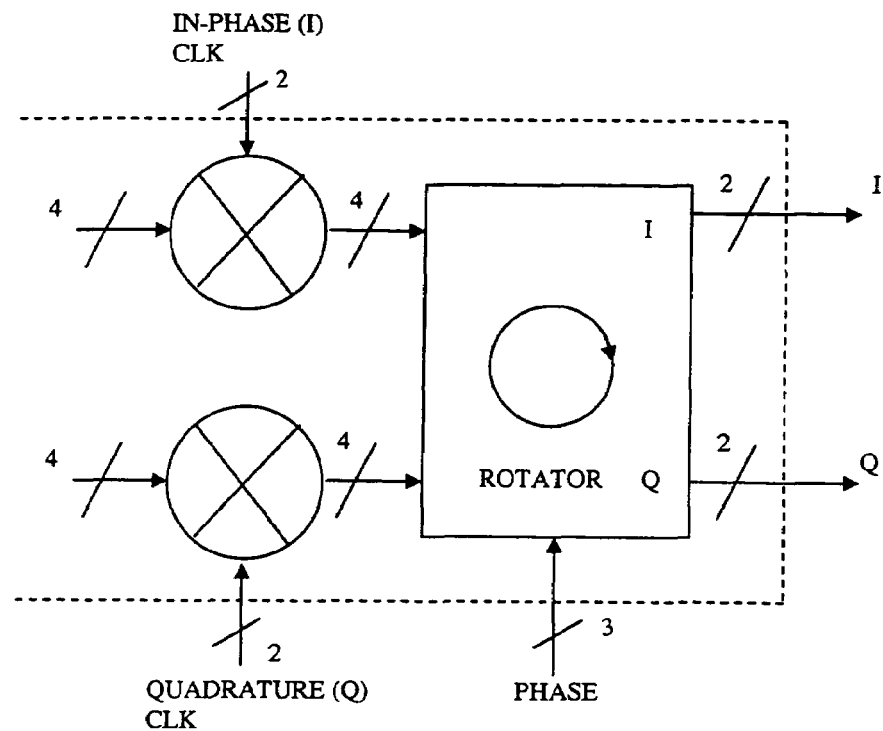
FIGS. 1 and 2 illustrate a prior art phase rotator in accordance with U.S. Pat. No. 5,555,534.
Figure 2:
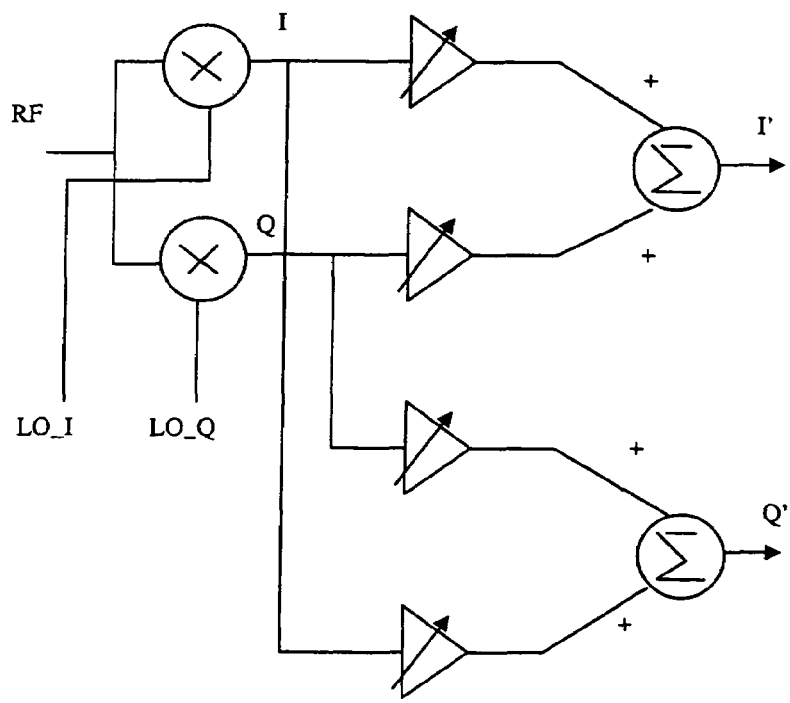
Figure 3:
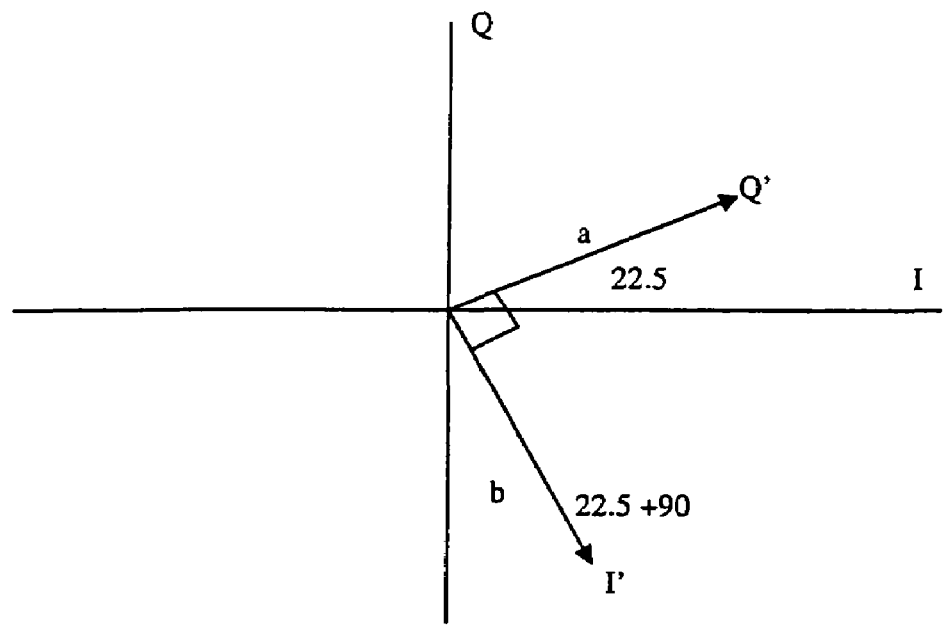
FIG. 3 illustrates the phase rotation of the prior art phase rotator of FIGS. 1 and 2.
Figure 4:
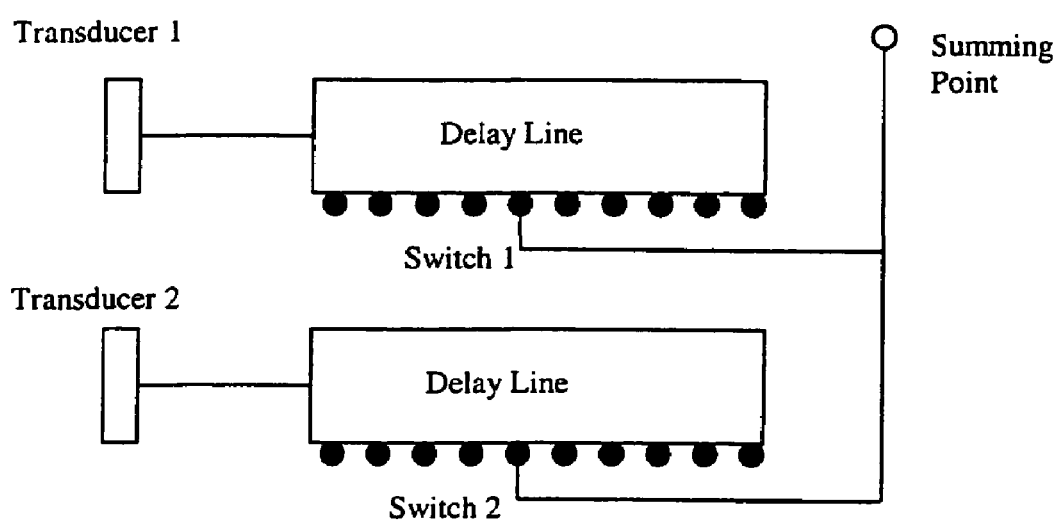
FIG. 4 illustrates the compensation of delays by changing taps on delay lines in accordance with U.S. Pat. No. 4,140,022.
Figure 5:
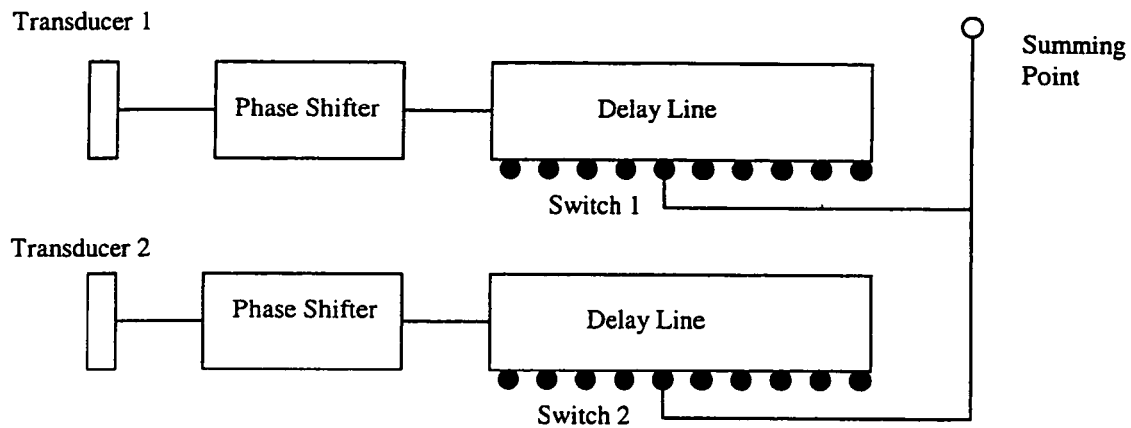
FIG. 5 illustrates prior art in which phase shifting means are used in combination with coarsely tapped delay lines to achieve the phase coherence required for focusing in a continuous wave ultrasound receiver.
Figure 6:
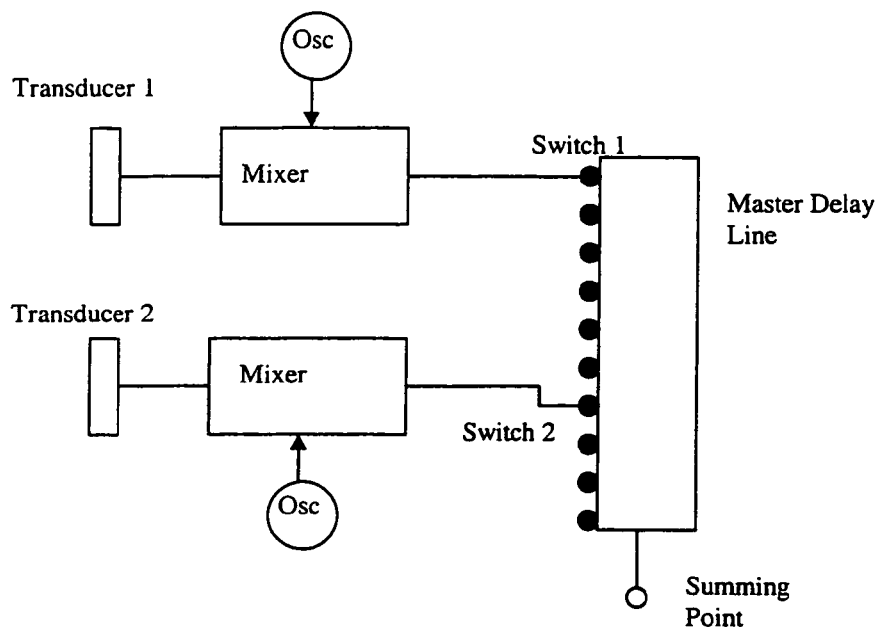
FIG. 6 illustrates a method in accordance with U.S. Pat. No. 4,140,022.
Figure 7:
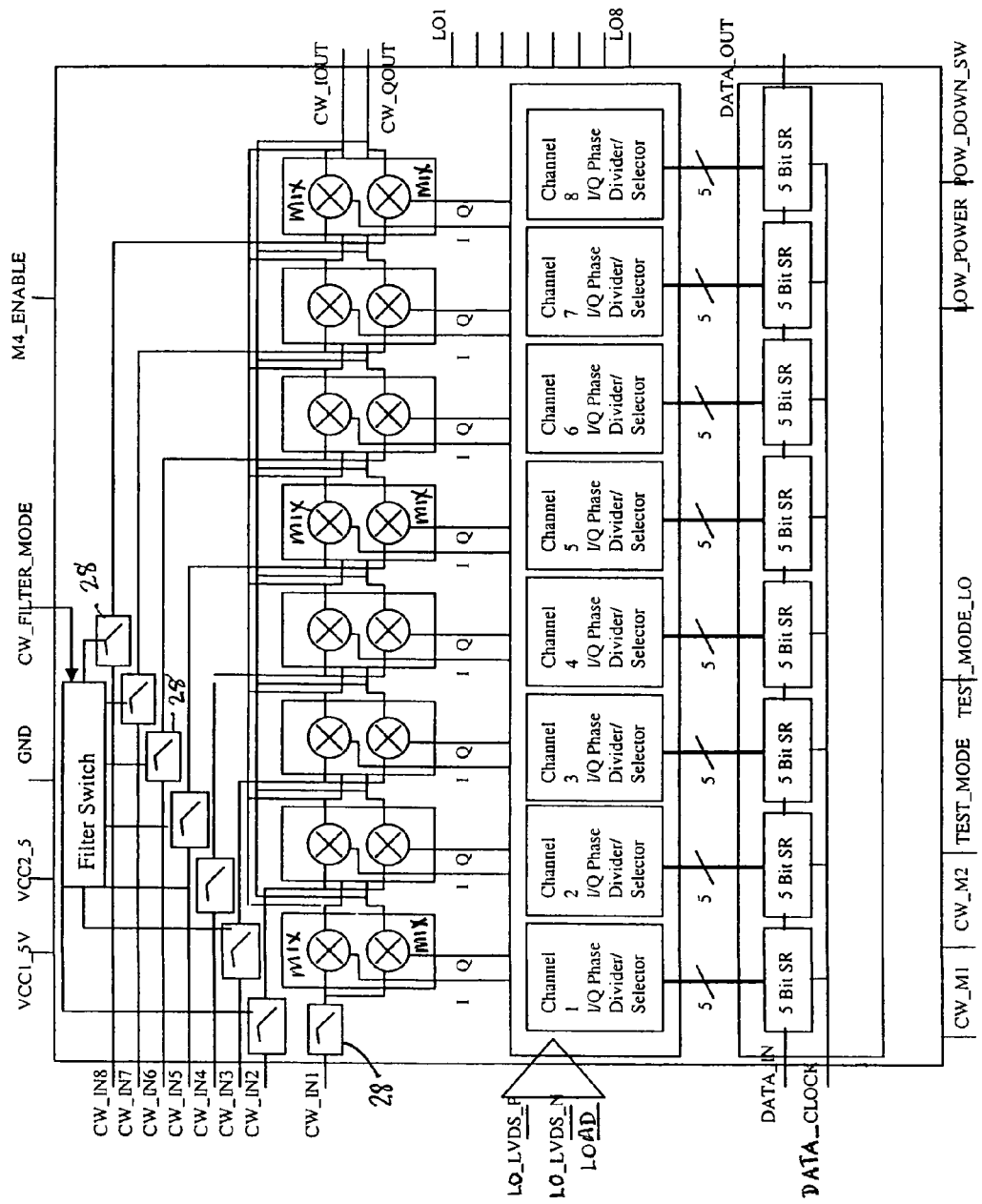
FIG. 7 is a block diagram of one embodiment receiver of the present invention.
Figure 8:
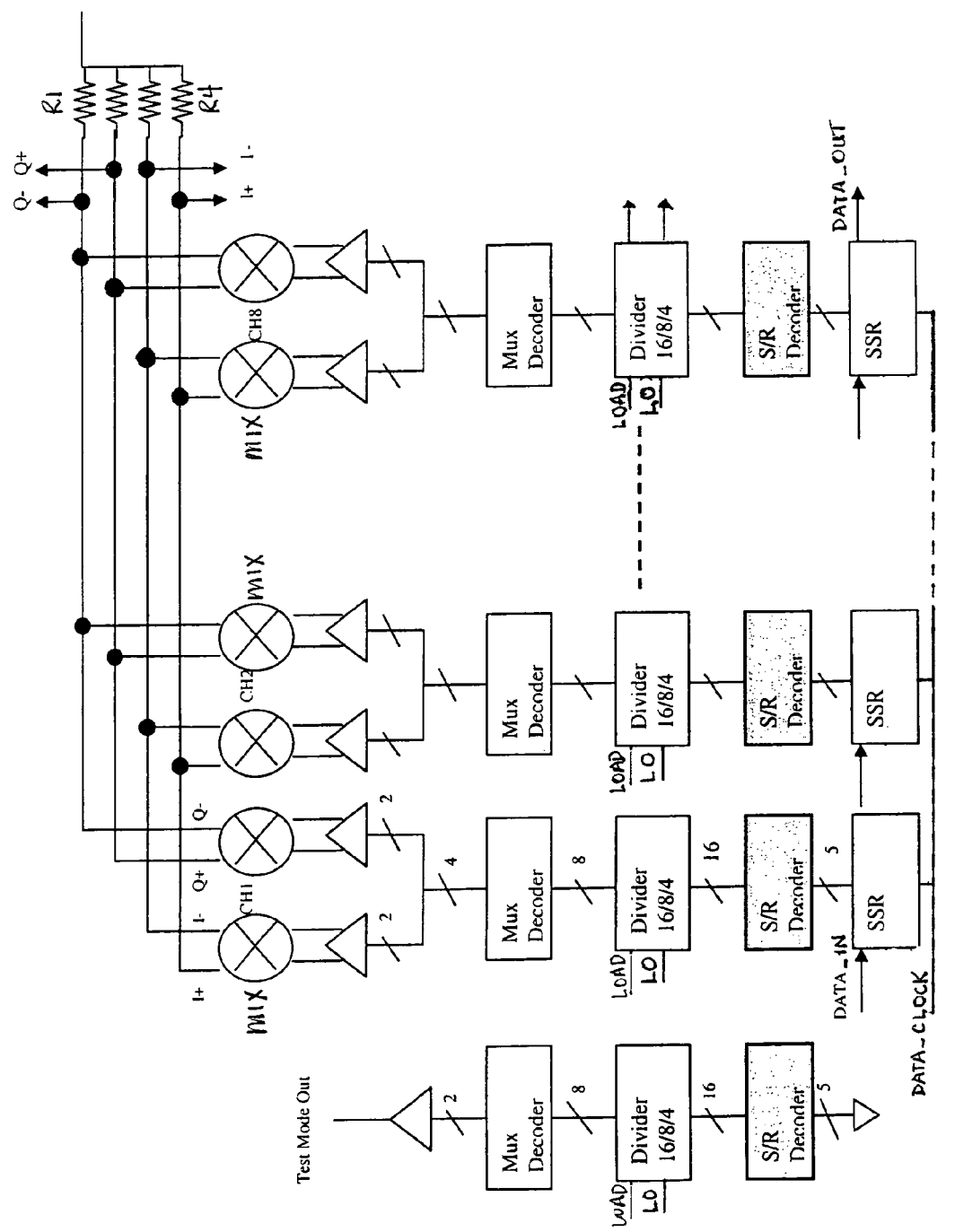
FIG. 8 is a further block diagram of the embodiment of FIG. 7.

In a preferred embodiment, a symmetric MUX 22 (FIG. 9a) controlled by MUX decoder 24 is used to tap the appropriate register length of the counter, making it possible to reuse only a portion of the 16 phase counter for 8 and 4 phase operation by inverting and feeding back the outputs of the fourth and the second D flip-flop. In general, quadrature is obtained between the N'th D flip-flop and the N/2 D flip-flop (where N represents the number of registers used in the ring counter). For example, in the case of 16 phase operation, quadrature exists between the 4'th and 8'th D flip-flops, respectively. In the case of 8 phase operation, quadrature exists between the 2'nd and 4'th D flip-flops, and in the case of 4 phase operation, quadrature exists between the 1'st and 2'nd D flip-flops. Note the feedback to MUX 22 taken from the outputs of the 2'nd, 4'th and 8'th D-flip-flops, and the outputs 26 taken from the 1'st, 2'nd, 4'th and 8'th D flip-flops that form the inputs to the MUX decoders of FIG. 8 which provide the inphase and quadrature mixer MIX clocks of the desired phasing. The ultrasound receiver signal inputs CW_IN1 to CW_IN8 to the mixers MIX are not shown in FIG. 8, but are shown in FIG. 7. The outputs of the mixers are summed by summing resistors R1 through R4. The use of a separate counter for each channel provides a noise improvement by un-correlating the noise contributions of each channel relative to the coherent Doppler signal.

Thus phase relationships between channels are determined by applying the desired SET and RESET conditions to each of the D flip-flops in the ring counter prior to the application of the LO clock (see FIG. 8) to each counter.

Synchronization occurs via the LOAD pulse. The mixer clock is first turned off, then the DATA is clocked into the serial port via the DATA_CLOCK. This occurs while the LOAD line is HI. At this point the DATA is clocked into the shift register (5-bit SRs of FIG. 7, the SSRs of FIG. 8) and the LOAD line is pulsed LO and then HI before the mixer clock resumes. The data which has just been clocked in then propagates though the decoder to the D flip-flops's S/R inputs in the dividers through buffer amplifiers AMP (FIGS. 9c and 9d). This puts the flip-flops in the ring counters in the proper initial condition when the LO clock is applied for synchronization.

In a preferred embodiment of the present invention there are four separate modes of operating the continuous wave Doppler (CWD) beamformer.

Figure 10:
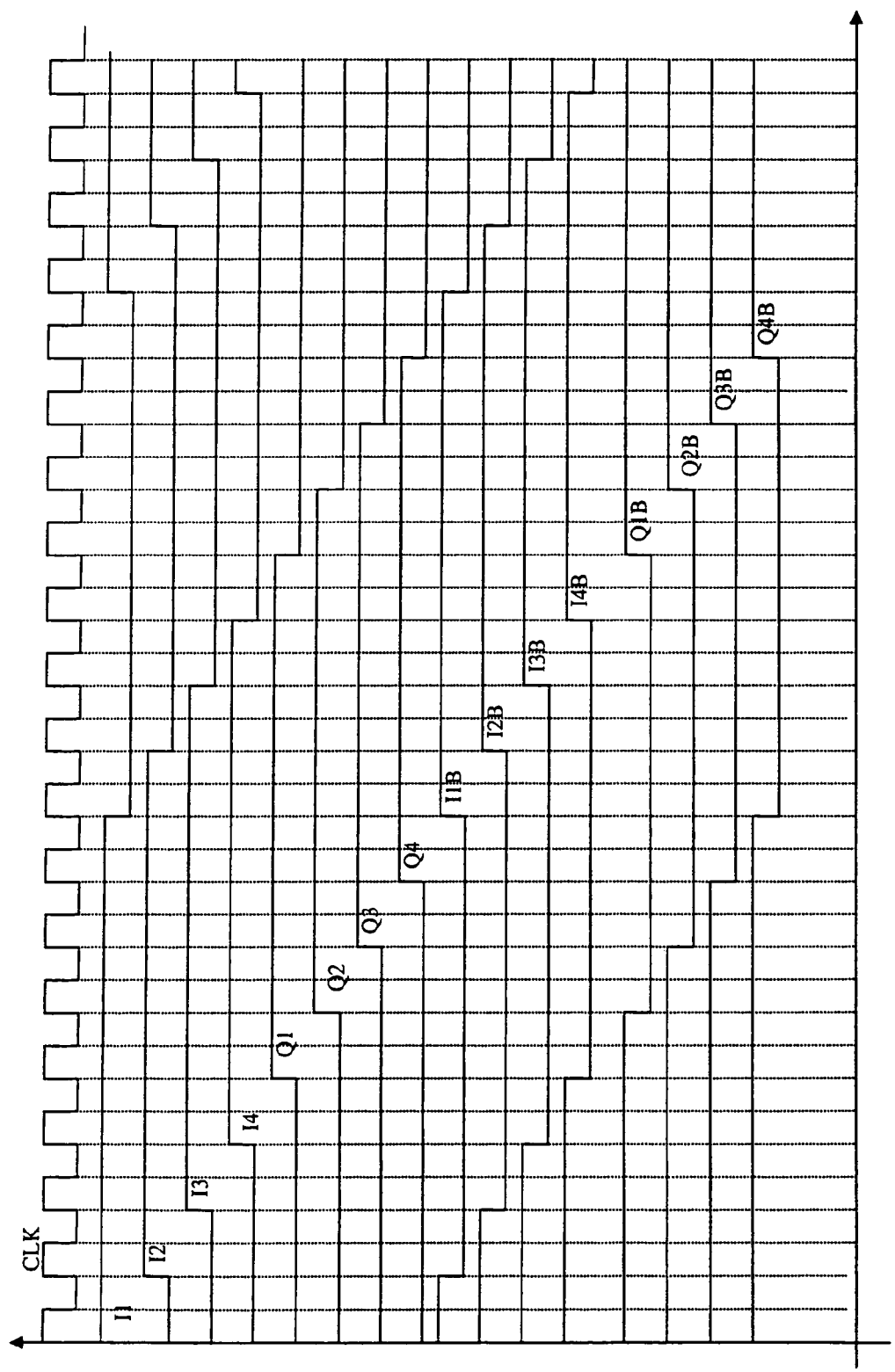
FIG. 10 illustrates the phase states for the divide-by-16 mode.

Mode 1—The user provides an input frequency of 16×FLO. As the CWD LO frequency range is 1-7.5 MHz, the input frequency provided by the user is 16-120 MHz. This high clock frequency requires a differential LVDS input. The 16×FLO input is then divided by 16 to produce the 16 phases (FIG. 10). These 16 phases are generated for each of the 8 channels and programmed for the selected phase by the serial shift register (5-bit SRs of FIG. 7, the SSRs of FIG. 8). Each channel has a corresponding 5-bit shift register (4 bits for phase programming and 1 bit for channel enable) which is used to program the output phase of the divide-by-16 circuit. The first 4 bits of the shift register are for programming the 16 phases, the 5'th bit allows the user to turn ON/OFF each channel individually via the serial bus.

Figure 11:
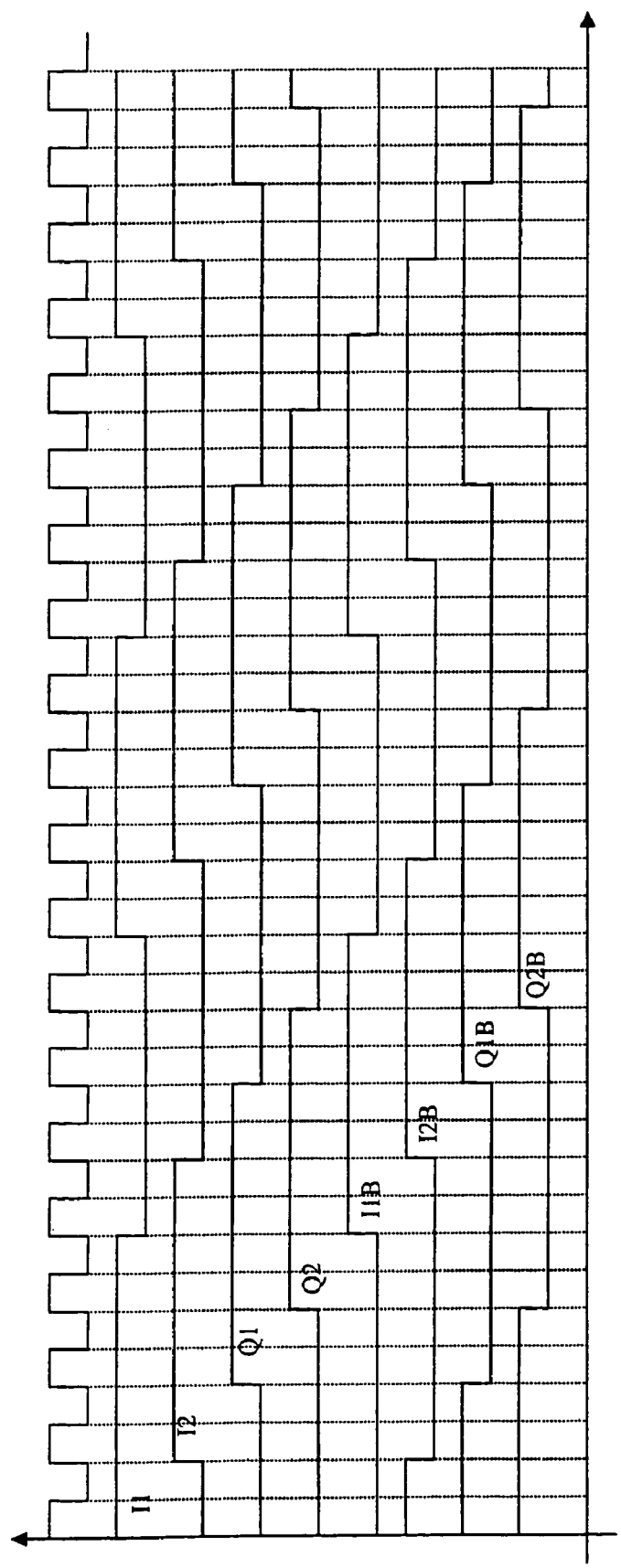
FIG. 11 illustrates the phase states for the divide-by-8 mode.

Mode 2—The user provides an input frequency of 8×FLO. As the CWD LO frequency range is 1-7.5 MHz, the input frequency provided by the user is 8-60 MHz. This high clock frequency requires a differential LVDS input. The 8×FLO input is then divided by 8 to produce 8 phases (FIG. 11). These 8 phases are generated for each of the 8 channels and programmed for the selected phase by a serial shift register (5-bit SRs of FIG. 7, the SSRs of FIG. 8). The serial shift register is common to modes 1-3. Each channel has a corresponding 5-bit shift register (4 bits for phase programming and 1 bit for channel enable) which is used to program the output phase. Note however, that as we are generating 8 phases, only 3 of the 4 phase programming bits are required. The user will load 5 bits per channel using the serial shift register but the phase programming LSB is a dummy bit (or don't care). The 5'th bit in the shift register allows the user to turn ON/OFF each channel individually via the serial bus.

Figure 12:
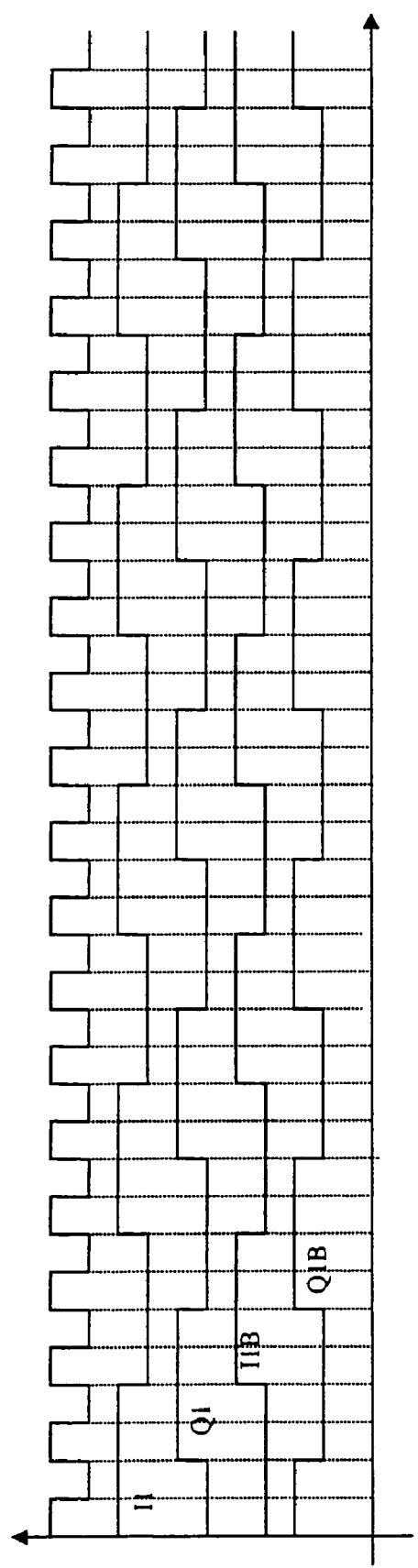
FIG. 12 illustrates the phase states for the divide-by-4 mode.

Mode 3—The user provides an input frequency of 4×FLO. As the CWD LO frequency range is 1-7.5 MHz the input frequency provided by the user is 4-30 MHz. This clock frequency can utilize 3V CMOS inputs. In this mode the user provides the appropriate phases and there is a separate 4LO input for each channel. The 4×FLO inputs are then divided by 4 to produce 4 phases (FIG. 12). These 4 phases are generated for each of the 8 channels and programmed for the selected phase by a serial shift register (5-bit SRs of FIG. 7, the SSRs of FIG. 8). The serial shift register is common to modes 1-3. Each channel has a corresponding 5-bit shift register (4 bits for phase programming and 1 bit for channel enable) which is used to program the output phase. Note however, for generating 4 phases, only 2 of the 4 phase programming bits are required. The user will load 5 bits per channel using the serial shift register but the two phase programming LSB's are dummy bits (or don't cares) and the 5'th bit in the shift register allows the user to turn ON/OFF each channel individually via the serial bus.

Mode 4—The user provides an input frequency of 4×FLO. As the CWD LO frequency range is 1-7.5 MHz, the input frequency provided by the user is 4-30 MHz. This clock frequency can utilize 3V CMOS inputs. In this mode, the user provides the appropriate phases and there are separate 4LO inputs for each channel. The 4LO input is used to generate accurate (duty cycle independent) quadrature. The serial shift register is not used in this mode. A reset line is provided to the user so that the user can synchronize all of the CWD channels. The reset line is implemented via the reset pin available on the Resettable Master-Slave D-FF.

Note that modes 1-3 are all programmable phase options and require a common serial interface bus. In the first three modes, synchronization is accomplished by the serial shift register load line. In mode 4, the user provides the phases for each channel and therefore no programmability or serial bus is required. Mode 4 is also different than modes 1-3 in that it achieves synchronization via a reset line provided.

As stated previously, the beamformer of the present invention is programmed using a serial shift register arrangement. This greatly simplifies the complexity of the program circuitry, reduces the number of IC pins necessary for programming, and reduces the PCB layout complexity. The data in (DATA_IN) and data out (DATA_OUT) can be daisy chained from device to device and all front-ends can run off a single programming clock. Also the mixer clock preferably is designed for multi-drop termination so multiple front-end ICs can be driven from a single driver. If it is not practical for a single driver to drive all front-end ICs, it is preferable to at least optimize the input to reduce the number of mixer clock drivers required.

Figure 13:
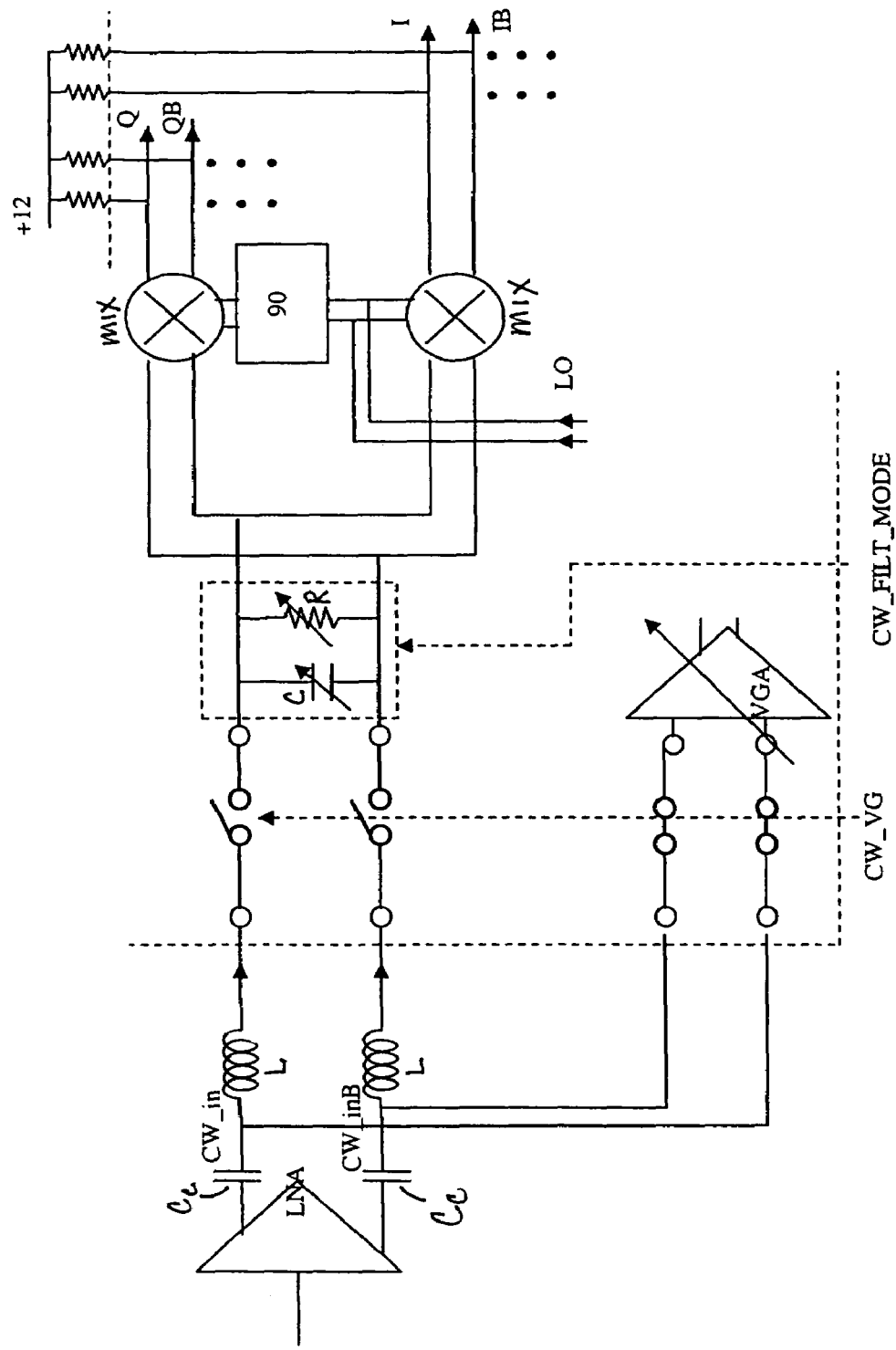
FIG. 13 illustrates the variable filter elements and variable gain amplifiers switchable into the ultrasound receiver signal paths in a preferred embodiment of the present invention.

Referring again to FIG. 7, another feature of the preferred embodiment of the present invention may be seen. The ultrasound receiver signal inputs CW_IN1 to CW_IN8 to the mixers MIX are schematically illustrated as being switchable in that Figure. Greater detail on this aspect of the preferred embodiment may be seen in FIG. 13. As shown in FIG. 13, each ultrasound receiver signal is amplified and converted to differential form by a low noise amplifier LNA, and coupled to the integrated circuit of the preferred embodiment by capacitors Cc and inductors L, all off-chip elements. The on-chip switches switch the differential signals between coupling the ultrasound receiver signals to parallel filter elements R and C and then to the mixers MIX, and couple the ultrasound receiver signals to low noise amplifiers LNA and then to the mixers MIX. The low noise amplifiers LNA may have a variable gain that is continuously variable or variable in steps throughout their range. Similarly, the filter elements R and C in the preferred embodiment are variable, and may also be continuously variable or variable in steps throughout their range. In the preferred embodiment, the RLC filters are low pass filters, the resistors R and capacitors C of all channels being variable to provide two low pass corner frequencies.

Referring again to FIG. 8, one additional channel is shown. This channel is an auxiliary test channel that as shown, is not loaded by the shift register. Instead, the four most significant bits input to its S/R Decoder are permanently tied to ground. This means that the auxiliary channel is always set to zero degrees phase relative. The 5'th bit, the channel enable for the other channels, is replaced by a TEST_MODE bit that is used to turn the auxiliary channel on or off (TEST_MODE=1 for aux channel "on" & TEST_MODE=0 for aux channel "off"). The MUX DECODER output of the auxiliary channel is buffered and supplied off-chip as the output Test Mode Out.

Thus while certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. An analog CW (continuous wave) beamformer having a plurality M of channels, each for connection to a channel receiver input resulting from an ultrasonic excitation of frequency F, comprising:

for each channel;

a ring counter having N phases;

circuitry for loading initial values into the ring counter;

the ring counter having a ring counter clock input frequency of N times the ultrasonic excitation frequency F for successively and repetitively clocking the initial values through the ring counter;

a MUX/decoder coupled to the ring counter to provide inphase and quadrature mixer drive signals with a phasing responsive to the initial values in the respective ring counter;

an inphase and a quadrature mixer coupled to the inphase and quadrature mixer drive signals, each having an input for coupling to a respective channel receiver input and inphase and quadrature baseband outputs for coupling to another analog CW (continuous wave) mixer's baseband summing circuitry.

2. The beamformer of claim 1 wherein the ring counter is a counter of N/2 stages, and wherein an output of the final stage is inverted and fed back as an input to the first stage, thereby providing the N phases.

3. The beamformer of claim 1 wherein the circuitry for loading initial values into the ring counter comprises a shift register.

4. The beamformer of claim 3 wherein the shift register includes one bit per channel for selective enabling and disabling of each channel.

5. The beamformer of claim 4 further comprised of an auxiliary channel for use in a self-test mode.

6. The beamformer of claim 1 further comprised of filters controllably switchable into and out of the coupling between each channel receiver input and the respective inphase and quadrature mixers.

7. The beamformer of claim 6 wherein the filters are low pass filters.

8. The beamformer of claim 7 wherein the filters are switchable between multiple corner frequencies.

9. The beamformer of claim 6 further comprised of variable gain amplifiers controllably switchable into and out of the coupling between each channel receiver input and the respective inphase and quadrature mixers.

10. The beamformer of claim 1 further comprised of variable gain amplifiers controllably switchable into and out of the coupling between each channel receiver input and the respective inphase and quadrature mixers.

11. The beamformer of claim 1 wherein M=8.

12. The beamformer of claim 1 wherein the beamformer is configured to allow cascading of multiple beamformers by connecting beamformers in series.

13. The beamformer of claim 1 wherein N=16.

14. The beamformer of claim 1 wherein M=8 and N=16.

* * * * *